United States Patent [19]

Maraud et al.

[11] Patent Number: 5,201,490
[45] Date of Patent: Apr. 13, 1993

[54] VALVE WITH A FLOATING STOP SEAL FOR HIGH FLOW RATES

[75] Inventors: Bruno Maraud, La Bruffiere; Joel Guicheteau, Rue du Viaduc; Jean Bonnefous, La Bruffiere, all of France

[73] Assignee: Defontaine S.A., Saint Herblain, France

[21] Appl. No.: 846,720

[22] Filed: Mar. 6, 1992

[30] Foreign Application Priority Data

Mar. 11, 1991 [FR] France .................. 91 02907

[51] Int. Cl.$^5$ .................................. F16K 1/34
[52] U.S. Cl. ........................ 251/120; 251/210; 251/368; 251/900
[58] Field of Search .............. 251/210, 120, 900, 368

[56] References Cited

U.S. PATENT DOCUMENTS

| | | |
|---|---|---|
| 1,217,725 | 2/1917 | Eckenroth . |
| 2,666,614 | 1/1954 | Grove et al. . |
| 2,737,980 | 3/1956 | Taylor et al. . |
| 2,912,001 | 11/1959 | Green ...................... 251/210 X |

FOREIGN PATENT DOCUMENTS

| | | | |
|---|---|---|---|
| 596796 | 4/1960 | Canada ...................... | 251/210 |
| 45141 | 2/1982 | European Pat. Off. . | |
| 1143369 | 2/1963 | Fed. Rep. of Germany . | |
| 2094668 | 2/1972 | France . | |
| 408573 | 9/1966 | Switzerland . | |

Primary Examiner—Arnold Rosenthal
Attorney, Agent, or Firm—Bachman & La Pointe

[57] ABSTRACT

A gate-valve comprising a gate-valve body inside of which a gate-valve seat is formed having a stop surface delimiting the orifice of a pipe, a valve moving in a linear direction in the gate-valve body, the valve having an upper shoulder and a lower shoulder axially distanced from the upper shoulder, and a seal fitted between the two shoulders intended to stop the orifice of the pipe, the pipe having an internal peripheral surface which is parallel with the direction of displacement of the valve, characterized in that the valve comprises a limiting means to limit the flow of a liquid between a surface of the valve and the internal peripheral surface of the pipe during the displacement of the valve while the seal is not completely removed from the orifice of the pipe.

10 Claims, 4 Drawing Sheets

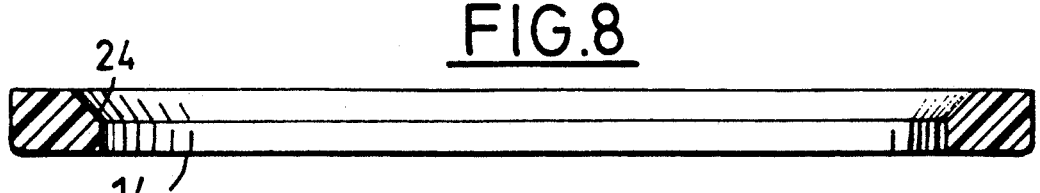
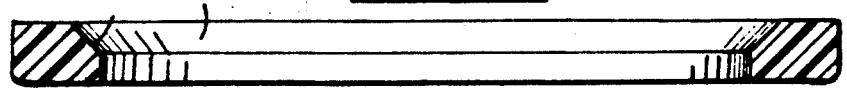
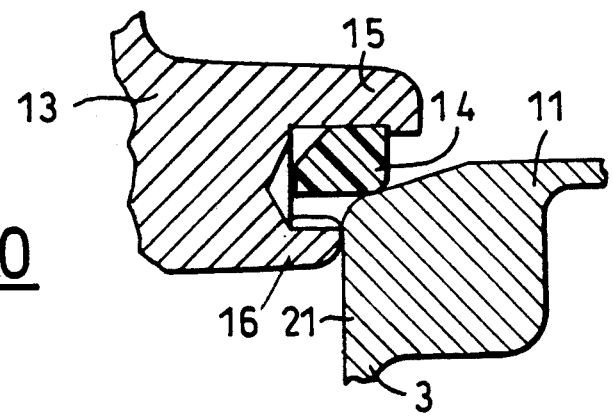
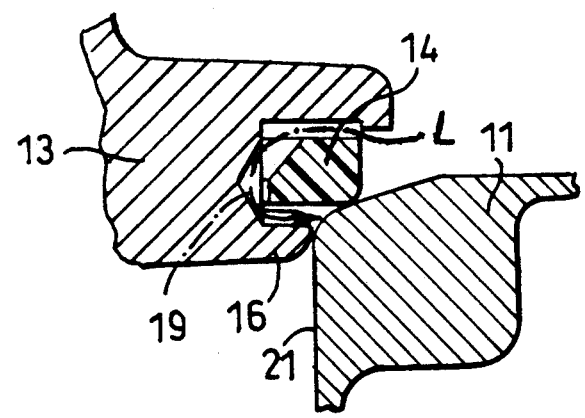
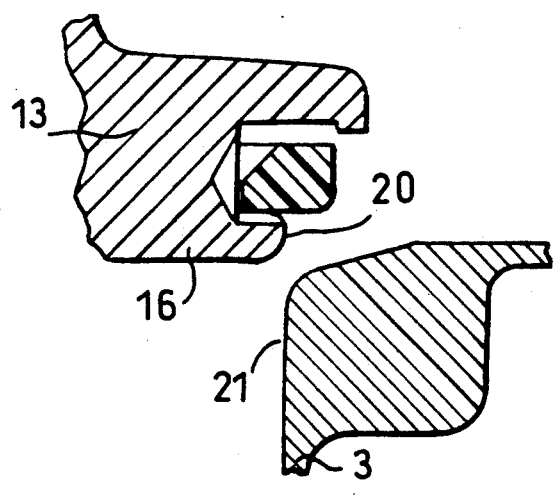

VALVE WITH A FLOATING STOP SEAL FOR HIGH FLOW RATES

BACKGROUND OF INVENTION

The invention relates to a gate-valve, in particular a sanitary gate-valve which is used in the agricultural and food, pharmaceutical, cosmetic or other industries, where it is important to clean the gate-valve periodically.

The invention more particularly relates to a class of gate-valves, with single, double or other staunchness, for sanitary use for installations involving high liquid flow rates, for example in industries manufacturing food products.

It is known to use, for such applications, a gate-valve comprising a gate-valve body inside of which a gate-valve seat is formed having a stop surface delimiting the orifice of a pipe, a valve moving in a linear direction in the gate-valve body, the valve having an upper shoulder and a lower shoulder axially distanced from the upper shoulder, and a seal fitted between the two shoulders intended to stop the orifice of the pipe, the pipe having an internal peripheral surface which is parallel with the direction of displacement of the valve.

It is common to fit such gate-valves with a relatively soft seal, for example an elastomer seal, fitted around an inclined or curved portion of the end of the valve after having being expanded by heating. However this type of seal has poor resistance to chemical attack and consequently is not suitable for sanitary installations.

Recently recourse has been made to another type of seal, formed from a rigid material based on fluorinated resins of the PTFE type, which does not exhibit the disadvantage mentioned above.

Furthermore, as mentioned previously, it is important, in sanitary installations, to clean the gate-valve periodically in order to eliminate deposits of products which lodge more particularly between the seal and the valve. In fact these deposits of products generate bacteria which contaminate the food or other products. Consequently, it is essential that the seal can be easily withdrawn from the valve in order to be cleaned correctly. However, it is preferable to be able to clean the gate-valve with all of the components (valve, seal) in position as the dismantling of the gate-valve is a waste of time.

SUMMARY OF THE INVENTION

For this purpose valve-seal assembly has been proposed which comprises a valve having an upper shoulder and a lower shoulder spaced axially from the upper shoulder in order to retain a seal between them, the seal comprising a rigid ring made from PTFE fitted over a plurality of elastically deformable fingers arranged to pass over the lower retaining shoulder by assuming an unfolded position and then to press on the lower retaining shoulder when they are released in order to lock the rigid ring between the two shoulders. Thus the ring can have an internal diameter which is substantially larger than the diameter of the valve between the two shoulders in order to allow the circulation of a liquid between the ring and the valve in the open position of the gate-valve. This seal, called a floating seal, can therefore be cleaned automatically without dismantling the gate-valve.

However, this known valve-floating seal assembly has numerous disadvantages. Firstly, it was noted that product particles accumulated in the vicinity of the elastically deformable fingers which constitute bacteria traps. Furthermore, the elastically deformable fingers increase the complexity and size of the floating seal with respect both to its height and its diameter. Finally, this valve-floating seal assembly is not suited to high flow rates because the floating seal deforms in its housing or tears away from the valve under the effect a powerful throttling of a liquid at the moment of opening the gate-valve. This tearing phenomenon is furthermore facilitated by the fact that the liquid applies a force tending to press the seal against the gate-valve seat while the valve acts in the opposite direction when it is operated in order to open the gate-valve. When the seal is finally detached from the gate-valve seat under the action of the valve, it is subject to the throttling effect of the liquid passing between the seal and the edges of the orifice of the pipe. If the throttling effect of the liquid on the seal is powerful, that is to say in the case of high liquid flow rates in the gate-valve, the floating seal is distorted or is puffed up which can cause serious damage. It then becomes necessary to dismantle the gate-valves often in order to check the state of the floating seals.

The purpose of the invention is to overcome the disadvantages mentioned above. In particular, a purpose of the invention is to provide a gate-valve, of the type mentioned above, capable of being used in various types of industrial installations, more specifically in sanitary installations where it is required to clean the gate-valves frequently and to visually inspect the internal surfaces of the gate-valves in order to check the quality of the cleaning procedures used.

Another purpose of the invention is to provide a gate-valve including a seal which can "float" in order to facilitate the cleaning of the gate-valve in position.

Another purpose of the invention is to provide a gate-valve in which the floating seal resists chemical attack, high temperatures and generally maintains its characteristics well over a period of time, has as small a size as possible, is economic to manufacture and is easily detached from the valve of the gate-valve.

Another purpose of the invention is to provide a gate-valve adapted to divide or distribute a large range of ductings, in particular ductings with high flow rates.

Essentially, the principle according to the invention consists in having the hydrodynamic stresses, applied by the liquid flowing in the body of the gate-valve while the latter is open, borne by the body of the valve in the vicinity of the floating seal and by the edge of the orifice of the pipe in order to protect the seal from the throttling effect applied by the liquid until the seal is sufficiently removed from the orifice of the pipe In this way the phenomenon of distortion or tearing of the floating seal at high flow rates is avoided and because of this the reliability and strength of the gate-valve are improved.

More specifically, the invention proposes a gate-valve comprising a gate-valve body inside of which a gate-valve seat is formed having a stop surface delimiting the orifice of a pipe, a valve moving in a linear direction in the gate-valve body, the valve having an upper shoulder and a lower shoulder axially distanced from the upper shoulder, and a seal fitted between the two shoulders intended to stop the orifice of the pipe, the pipe having an internal peripheral surface which is parallel with the direction of displacement of the valve, characterized in that the valve comprises a limiting means to limit the flow of a liquid between a surface of the valve and the internal peripheral surface of the pipe during the displacement of the valve while the seal is not completely removed from the orifice of the pipe.

Advantageously, the gate-valve furthermore comprises means of creating a passage of liquid between the seal and the part of the valve between the two shoulders.

The limiting means is constituted by a peripheral surface of the lower shoulder in close proximity with the internal peripheral surface of the pipe.

The means of creating a passage of liquid between the seal and the part of the valve between the two shoulders are constituted from hollowings produced in the part of the valve between the two shoulders.

The hollowings are holes having a concave bottom.

The hollowings are distributed around the periphery of the valve between the two shoulders.

The seal is a seal floating between the two shoulders.

The floating seal has a substantially rectangular cross section the internal upper part of which is truncated.

The upper shoulder is prolonged by a nose piece for centering the floating seal.

The floating seal is made from a material based on fluorinated resins.

BRIEF DESCRIPTION OF THE DRAWINGS

Other characteristics and advantages of the invention will appear even better on reading the following description of an embodiment of the invention given with reference to the appended drawings in which like numerical references denote identical elements. In these drawings:

FIG. 8 shows a floating seal intended for the upper valve;

FIG. 9 shows a floating seal intended for the lower valve;

FIGS. 10 to 12 illustrate the operating principle of the gate-valve according to the invention.

DETAILED DESCRIPTION OF THE DRAWINGS

The gate-valve (or valve) according to the invention is intended for the division or distribution of ductings, in particular of ductings with a high flow rate, in which liquids, viscous food products or other products flow. The gate-valve according to the invention is preferably, but not exclusively, used in sanitary installations.

Figure 1:
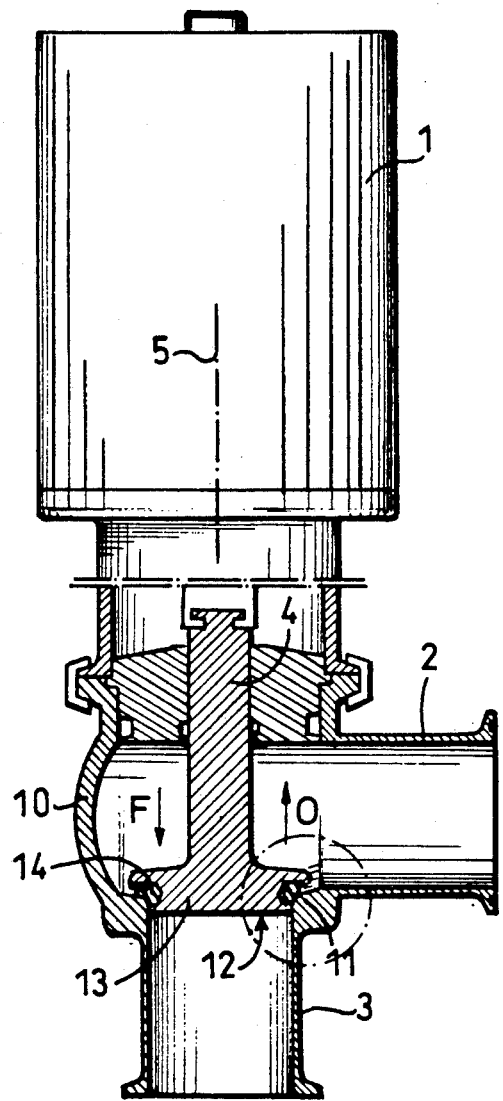
FIG. 1 shows a gate-valve with single staunchness having a stop valve according to the invention.

Referring to FIG. 1, a gate-valve with single staunchness has been shown. The gate-valve comprises a gate-valve body such as 10 having an inlet connected to an inlet pipe 2. Inside the gate-valve body (or housing) is formed a gate-valve seat 11 having a stop surface 12. The stop surface delimits the orifice of an outlet pipe 3. A stopping device with a floating seal is provided to close the orifice of the outlet pipe.

The stopping device is constituted from a valve 13 carrying a floating seal such as 14. The valve 13 is prolonged by a rod 4 (or valve member) guided by the upper part of the gate-valve such that it displaces in a linear direction along the longitudinal axis 5 of the rod due to the action of a controllable operating device such as 1, of any appropriate type, for example a jack or similar. The controllable operating device 1 actuates the rod 4 in order to bring the floating seal to bear on the gate-valve seat in order to stop the orifice of the outlet pipe or to detach the floating seal from the gate-valve seat in order to open a passage between the inlet pipe and the outlet pipe as is well known. These two translational movements of the rod are indicated by the arrows labeled F and O respectively.

In the preferred embodiment of the invention, the stopping device is designed to withstand high flow rates, that is to say it is ultimately designed to withstand high pressure levels, in the order of 8 bars or more, at the inlet of the gate-valve. According to the invention, it is a matter of preventing the liquid, under pressure in the inlet pipe, from distorting or tearing the floating seal during the start of the opening of the gate-valve. It is furthermore desirable to detach the floating seal from the gate-valve seat, at the moment of opening the gate-valve, without applying stresses which are too great on the seal and which tend to distort it. Finally, it is desirable to have the hydrodynamic forces applied by the liquid circulating in the gate-valve body borne by parts of the gate-valve which cannot be distorted, that is to say the valve and the edge of the orifice of the pipe forming the gate-valve seat.

Figure 2:
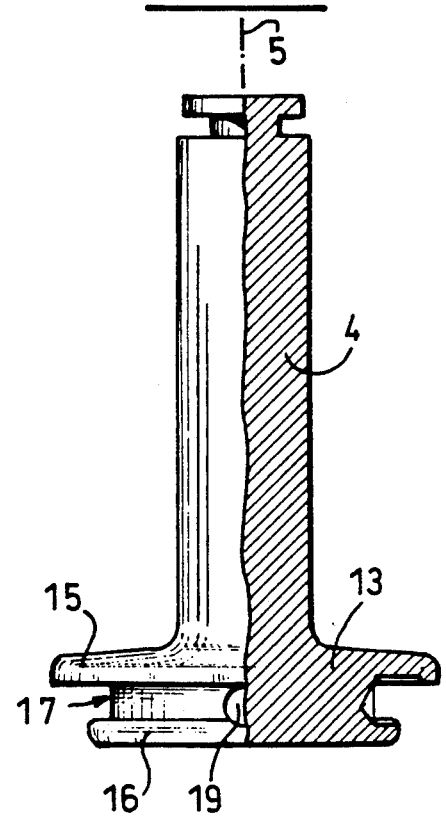
FIG. 2 shows the valve of the gate-valve in FIG. 1.

Referring to FIG. 2, the valve 13 comprises an upper peripheral shoulder 15 and a lower peripheral shoulder 16 axially distanced from the upper shoulder in order to define a groove 17 in which is fitted the seal which is initially passed over the lower shoulder and then subsequently held between the two shoulders. The seal 14 is shown in greater detail in FIGS. 8 and 9. It is in the shape of a ring, made from a rigid material based on fluorinated resins known as PTFE, having a substantially rectangular cross-section, this material withstanding chemical attack well and therefore being perfectly suited for sanitary installations. As the seal is floating between the two shoulders 15, 16, it is easy to remove it from the groove 17, by means of a blade for example, in order to replace it.

As shown in FIG. 2, the lower shoulder 16 is recessed radially with respect to the upper shoulder 15 in order that it may slip inside the outlet pipe 3 and leave a part of the lower surface of the seal protruding which bears on the gate-valve seat 11. The gate-valve seat has a bearing surface 18 which is inclined in order to improve the staunchness of the gate-valve when it is closed. The upper shoulder 15 completely covers the upper surface of the seal in order to press on the seal uniformly in order to guarantee good staunchness of the gate-valve.

Figure 3:
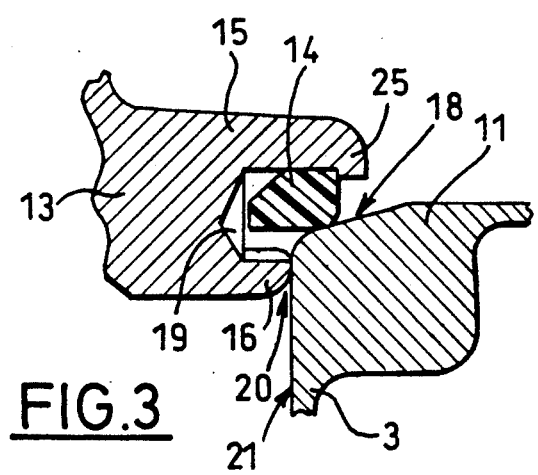
FIG. 3 shows a part of the valve in functional relationship with the body of the gate-valve as indicated within a circle in FIG. 1.

FIG. 3 shows the part of the valve in functional relationship with the gate-valve seat, this figure being a magnified view of the gate-valve part shown within a circle in FIG. 1. As shown in this figure, the dimension of the largest section of the lower shoulder 16 is adjusted so that the peripheral surface 20 of the lower shoulder corresponding to this large section is in close proximity with the internal peripheral surface 21 of the outlet pipe 3 close to the gate-valve seat 11. This close proximity limits the flow of a liquid between the inlet pipe 2 and the outlet pipe 3 while the seal is not completely disengaged from the orifice of the outlet pipe 3 as shown in FIGS. 10 and 12. It will therefore be understood that the seal 14 is not subjected to the throttling effect of the liquid at the start of the opening of the gate-valve since the flow rate remains very small as long as the peripheral surface 20 of the lower shoulder 16 remains opposite the internal peripheral surface 21 of the pipe 3, the latter being parallel with the direction of displacement of the valve.

The seal 14 moves between the two shoulders 15, 16 which are sufficiently spaced from each other and it floats around the part of the valve between the two shoulders in order to allow a cleaning liquid to pass over all of its hidden faces facing the valve when the gate-valve is open. Furthermore, the upper shoulder 15 is prolonged by a nose piece 25 for centering the floating seal 14 with respect to the axis of the orifice of the pipe 3.

Hollowings 19 (or passage means) are produced in the part of the valve between the two peripheral shoulders 15, 16 of the valve. These hollowings can be holes milled in the body of the valve, in a radial direction, preferably biting into the upper surface of the lower shoulder 16. The holes distributed over the periphery of the valve have an aperture diameter which is greater than the thickness of the seal at its internal periphery in order to create a large passage for liquid between the seal 14 and the valve 13.

The seal has a substantially rectangular cross-section whose internal upper part 24 is truncated in order to assist the passage of liquid between the seal and the valve and also to assist in the fitting of the seal onto the valve. The passage of liquid between the seal and the valve, while the seal is still bearing on the gate-valve seat 11, facilitates the detachment of the seal (elimination of the suction cup effect) at the moment of opening the gate-valve.

The holes have a concave bottom in order to prevent the deposit of particles and to facilitate their cleaning by injecting a washing liquid into the gate-valve.

Referring now to FIG. 10, the orifice of the outlet pipe 3 is closed hermetically by the seal 14 which is pressed against the gate-valve seat 11 by the action of the valve 13. In this closed position of the gate-valve, the seal is held against the lower face of the upper shoulder 15 while the end of the lower shoulder 16 is in close proximity with the internal peripheral surface 21 of the pipe 3.

Due to the action of the controllable operating device 1, the valve 13 is displaced in a linear direction in order to start the opening of the valve as shown in FIG. 11. Under the effect of the pressure of the liquid held in the inlet pipe 2, the seal 14 remains held against the gate-valve seat 11 while the part of the valve between the two shoulders slides longitudinally with respect to the seal until the seal is carried by the lower shoulder 16. The displacement of the valve with respect to the seal clears a space between the upper face of the seal and the lower surface of the upper shoulder 15, this space connecting with the hollowings 19 in order to create a passage of liquid between the seal and the valve almost totally surrounding the seal. This passage of liquid is symbolized by the arrow L.

The liquid circulating in the hollowings 19 is furthermore retarded under the effect of the close proximity of the peripheral surface 20 of the lower shoulder 16 with the internal peripheral surface 21 of the orifice of the pipe 3. This limitation of the flow of the liquid creates vortexes in the vicinity of the seal, in particular under the latter, which assists it in detaching itself from the gate-valve seat. The peripheral surface 20 of the lower shoulder brushes the internal peripheral surface 21 of the pipe 3 during a sufficient displacement of the valve in order to limit the flow of liquid as long as the seal has not completely disengaged itself from the orifice of the pipe, as shown in FIG. 12, that is to say when the flow of liquid through the orifice of the pipe takes place between the lower shoulder and the gate-valve seat such that the seal is not subjected to the throttling effect of the liquid.

Referring now to FIGS. 4 to 7, a gate-valve with double staunchness which is known per se and used for distributing two ductings 30, 40, has been shown. The gate-valve comprises a gate-valve body 10, a pipe 3 connecting the two ductings and two superimposed gate-valve seats $11_1$, $11_2$ delimiting two parallel stop surfaces corresponding to the two orifices of the pipe 3. A double valve comprising an upper valve $13_1$ and a lower valve $13_2$ simultaneously stops the two orifices of the pipe or releases them due to the action of a controllable operating device 1, in order to separate or respectively to connect the two ductings.

Figure 4:
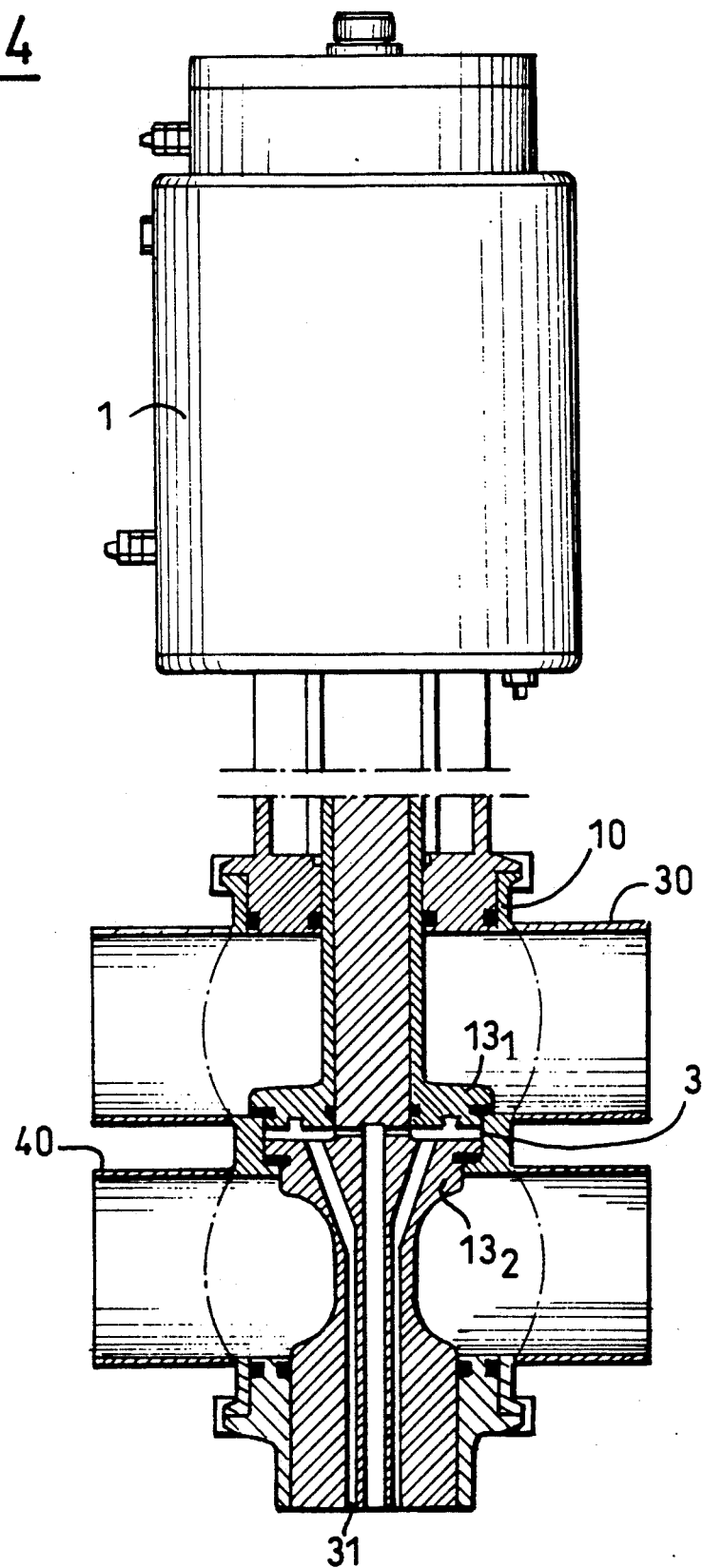
FIG. 4 shows a gate-valve with double staunchness having an upper valve and a lower stop valve according to the invention.
Figure 5:
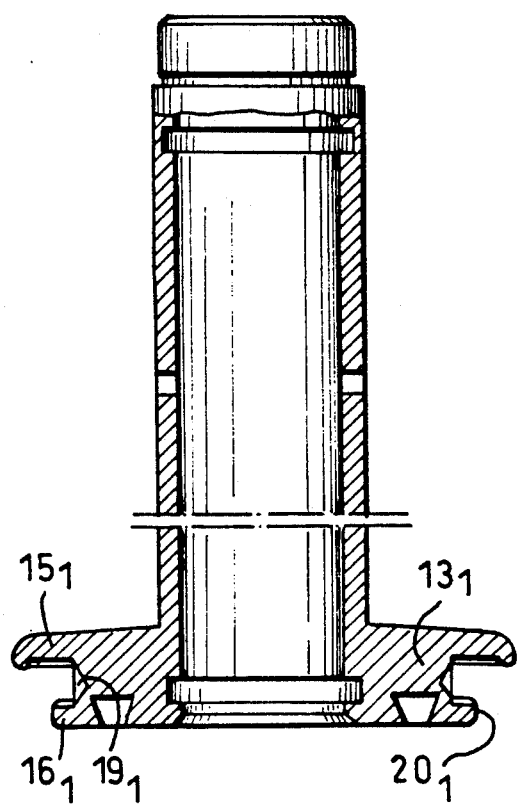
FIG. 5 shows the upper valve of the gate-valve of FIG. 4.
Figure 6:
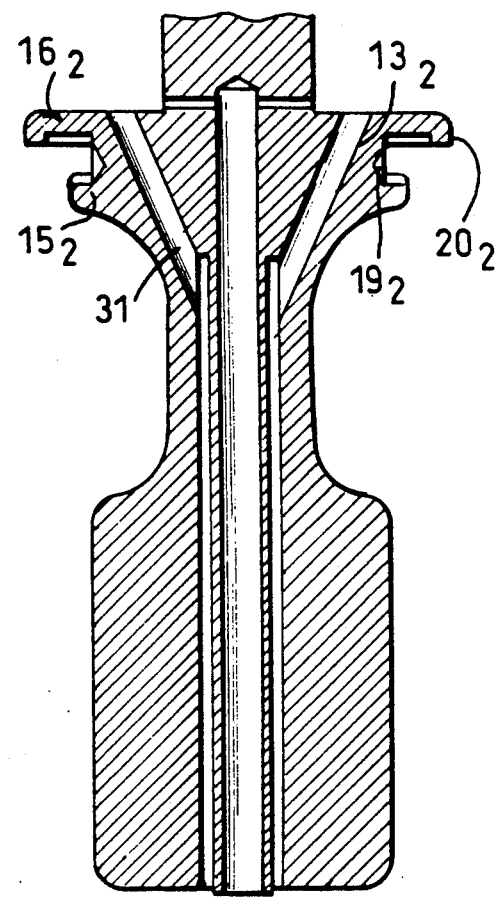
FIG. 6 shows the lower valve of the gate-valve of FIG. 4.
Figure 7:
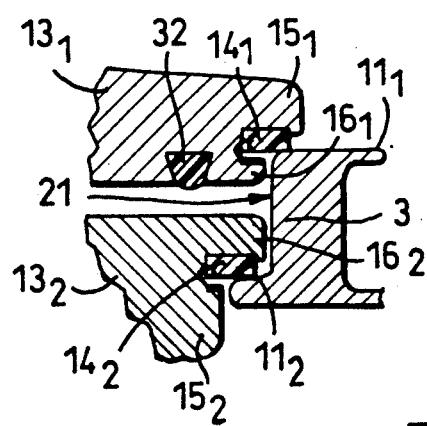
FIG. 7 shows a part of the upper and lower valves in functional relationship with the body of the gate-valve as indicated within a circle in FIG. 4.

In FIG. 4, the two valves are shown held in staunch contact due to a seal 32, but they can be separated by means of an opposite sliding due to the action of the controllable operating device 1, in order to clear a space between them. The lower valve is furthermore equipped with a leakage chamber 31 which is advantageously used for the in situ cleaning of the two valves when they are detached from one another.

Each valve comprises an upper shoulder $15_1$, $15_2$ and a lower shoulder $16_1$, $16_2$ spaced axially in order to house floating seals $14_1$, $14_2$ (FIGS. 8 and 9) intended to bear on the gate-valve seats in order to stop the pipe at its two ends.

As described previously, the lower shoulder of the upper valve is axially recessed from the upper shoulder and has a peripheral surface 20 in close proximity with the internal peripheral surface 21 of the pipe 3. On the other hand, the upper shoulder of the lower valve is axially recessed from the lower shoulder and the lower shoulder has a peripheral surface $20_2$ in close proximity with the internal peripheral surface 21 of the pipe 3.

Milled holes $19_1$, $19_2$ are produced between the upper and lower shoulders of each valve on the periphery of the valve.

The invention is of course not limited to the embodiment described above and it would advantageously be possible to provide variant embodiments without departing from the scope of the invention by so doing.

We claim:
1. A valve, comprising:
   a housing;
   an outlet pipe communicating with said housing, said outlet pipe having an internal surface;
   a valve seat associated with said outlet pipe;
   valve means slidably disposed in said housing for linear movement between a sealing position wherein said valve means seats on said valve seat so as to seal said outlet pipe, and an open position wherein liquid flows through said valve into said outlet pipe, said valve means comprising a valve member having in spaced apart relationship an upper shoulder and a lower shoulder connected by an inner peripheral surface, said lower shoulder having an outer peripheral surface in close proximity with said internal surface of said outlet pipe, said inner peripheral surface of said valve member cooperating with a lower surface of said upper shoulder and an upper surface of said lower shoulder to define a groove, passage means being formed on said inner peripheral surface of said valve member; and a seal, floatingly disposed in said groove, so that, when said valve member is in said sealing position, said seal is held between said lower surface of said upper shoulder and said valve seat so as to seal said outlet pipe, and so that, when said valve member is moved toward said open position, flow of liquid around said seal is limited until said outer peripheral surface of said lower shoulder is completely removed from said internal surface of said outlet pipe.

2. A valve as claimed in claim 1, wherein the means of creating a passage of liquid between the seal and the part of the valve between the two shoulders are constituted from hollowings (19) produced in the part of the valve between the two shoulders.

3. A valve as claimed in claim 2, wherein the hollowings are holes having a concave bottom.

4. A valve as claimed in claim 2, wherein the hollowings are distributed around the periphery of the valve between the two shoulders.

5. A valve as claimed in claim 1, wherein the floating seal has a substantially rectangular cross section the internal upper part (24) of which is truncated.

6. The valve as claimed in claim 1, wherein the upper shoulder is prolonged by a nose piece (25) for centering the floating seal.

7. A valve as claimed in claim 1, wherein the floating seal is made from a material based on fluorinated resins.

8. A valve according to claim 1, wherein, when said valve member is moved to said open position, liquid flows through said passage means so as to circulate over hidden faces of said seal.

9. A valve according to claim 1, wherein said outer peripheral surface of said lower shoulder brushes said internal surface of said outlet pipe whereby flow of liquid is limited until said seal is completely disengaged from said valve seat.

10. A valve, comprising:

a housing;

an outlet pipe communicating with said housing and having an inside surface;

a valve seat, associated with said outlet pipe along a path of communication from said housing to said outlet pipe;

valve means, slidably disposed in said housing for linear movement between a closed position wherein said valve means is sealed on said valve seat, and an open position wherein liquid can flow from said housing to said outlet pipe, said valve means comprising a valve member slidably disposed in said housing and having an upper shoulder portion and a lower shoulder portion defining therebetween a groove, a seal being floatingly disposed in said groove, passage means being formed in said groove for allowing liquid circulation around an inner surface of said seal, said lower shoulder portion being in close proximity in size to said inside surface of said outlet pipe so that, when said valve means is in said closed position, said lower shoulder portion limits flow between said lower shoulder portion and said inside surface of said outlet pipe, and said seal is held between a lower surface of said upper shoulder portion and said valve seat, and wherein, when said valve means is moved toward said open position, said valve member moves upward relative to said seal so as to allow liquid to circulate between said seal and said lower surface of said upper shoulder portion, and through said passage means, so as to eliminate suction effects on said seal and to expose hidden portions of said seal to liquid circulation, and said lower shoulder portion limits flow through said valve seat until said seal is clear of said valve seat so as to prevent throttling of liquid between said seal and said valve seat.

* * * * *